United States Patent
Harnett (10) Patent No.: US 10,037,701 B2
(45) Date of Patent: Jul. 31, 2018

(54) WATERCRAFT NAVIGATION SAFETY SYSTEM

(71) Applicant: NAVICO HOLDING AS, Egersund (NO)

(72) Inventor: Mark Harnett, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 15/187,038

(22) Filed: Jun. 20, 2016

(65) Prior Publication Data

US 2017/0365175 A1 Dec. 21, 2017

(51) Int. Cl.
*G08G 3/02* (2006.01)
*G05D 1/02* (2006.01)
*B63B 45/08* (2006.01)
*B63H 20/14* (2006.01)

(52) U.S. Cl.
CPC ............. *G08G 3/02* (2013.01); *B63B 45/08* (2013.01); *B63H 20/14* (2013.01); *G05D 1/0206* (2013.01); *B63B 2727/02* (2013.01)

(58) Field of Classification Search
CPC .......... G08G 3/02; B63B 45/08; B63H 20/14; G05D 1/0206
USPC ......................................................... 701/21
See application file for complete search history.

(56) References Cited

U.S. PATENT DOCUMENTS

| | | | |
|---|---|---|---|
| 6,750,815 B2 | 6/2004 | Michaelson et al. | |
| 7,589,646 B2 | 9/2009 | Glover | |
| 2003/0112171 A1* | 6/2003 | Michaelson | B63B 43/18 342/41 |
| 2004/0090195 A1* | 5/2004 | Motsenbocker | B63B 43/18 318/109 |
| 2011/0022316 A1* | 1/2011 | Bendito Vallori | B63H 21/22 701/301 |
| 2011/0279673 A1* | 11/2011 | Teich | B63B 49/00 348/148 |
| 2017/0139044 A1* | 5/2017 | Laster | G01S 15/8902 |

* cited by examiner

*Primary Examiner* — Yazan A Soofi
(74) *Attorney, Agent, or Firm* — Nelson Mullins Riley & Scarborough LLP (57) ABSTRACT

Apparatuses, methods, and computer-readable medium for navigation safety and collision prevention are described herein. The apparatus may cause the collection of marine electronic data from marine data sources. Marine data sources may include a radar system, a sonar system, a position system, a tracking system, and/or a chart system. The apparatus may further determine, based upon the marine electronic data, the presence of a hazard in the projected path of the watercraft. The apparatus may determine if the hazard is within a threshold distance and, in response, may cause the watercraft to stop before reaching the hazard. In some instances, the apparatus may transmit a warning alert to the watercraft operator, and after a predetermined period of time without response by the operator, the apparatus may cause the watercraft to stop to prevent collision with the hazard.

20 Claims, 6 Drawing Sheets

WATERCRAFT NAVIGATION SAFETY SYSTEM

FIELD OF THE INVENTION

Embodiments of the present invention relate generally to navigation safety systems for watercraft and, more particularly, to collision prevention systems, assemblies, and associated methods for hazard detection and response.

BACKGROUND OF THE INVENTION

Autopilot systems are useful for unmanned control of a watercraft (or other vehicle) to a destination. However, obstacles or hazards may exist along the route being navigated by the autopilot that can lead to unsafe travel. Without (or even with) human interaction, such hazards can be difficult to detect and avoid. Through applied effort, ingenuity, and innovation, many of these identified problems have been solved by developing solutions that are included in embodiments of the present invention, many examples of which are described in detail herein.

BRIEF SUMMARY OF THE INVENTION

Autopilot navigation of a watercraft can be useful to aid a user in performing many different marine activities. For example, a user can fish while the watercraft slowly motors around a predefined route. Notably, however, without human interaction, the autopilot may not be configured to detect and/or avoid hazards that may exist along the predefined route.

Some autopilot systems may include collision prevention and safety systems that can steer a watercraft around a hazard. However, such a system may inadvertently endanger the watercraft by steering the watercraft into another hazard. In this regard, example embodiments of the present invention described herein are configured to detect hazards and cause the watercraft to stop before reaching the hazard. In some embodiments, detection of the hazard can occur based on marine data gathered from many different sources (e.g., sonar systems, radar systems, chart systems, etc.). Additionally, in some embodiments, the determination of when a hazard is within a project path and necessitates the watercraft to be stopped can be based on many different factors (e.g., distance to the hazard, depth of the hazard, velocity of the watercraft, etc.). Further, some example embodiments contemplate providing one or more alerts to a user of the watercraft to enable the user address the hazard and, if the user doesn't respond, causing the watercraft to stop before reaching the hazard.

An example embodiment of the present invention provides an apparatus comprising a processor and a memory including computer program code stored thereon. The computer program code is configured, when executed, to cause the apparatus to transmit one or more navigation instructions to at least one motor controller for navigating a watercraft along a route. The computer program code is further configured, when executed, to cause the apparatus to receive marine electronic data from one or more marine electronic data sources as the watercraft travels along the route. The computer program code is further configured, when executed, to cause the apparatus to determine, based on the marine electronic data, if a hazard is in a projected path of the watercraft based on the route. The computer program code is further configured, when executed, to cause the apparatus to cause, via the at least one motor controller, the watercraft to stop before reaching the hazard in an instance which the hazard is determined to be in the projected path.

In some embodiments, the computer program code is further configured, when executed, to cause the apparatus to determine a distance to the hazard from the watercraft, determine if the distance to the hazard is within a threshold distance, and cause the watercraft to stop in an instance in which the distance to the hazard is within the threshold distance. Additionally, the computer program code may be further configured, when executed, to cause the apparatus to determine a velocity of the watercraft, determine if the velocity of the watercraft is above a minimum threshold velocity, and cause the watercraft to stop in an instance in which the distance to the hazard is within the threshold distance and the velocity exceeds the minimum threshold velocity. Additionally or alternatively, the computer program code may be further configured, when executed, to cause the apparatus to determine a depth of the hazard, determine if the depth of the hazard is within a threshold depth corresponding to a minimum safe depth for the watercraft, and cause the watercraft to stop in an instance in which the depth of the hazard is within the threshold depth and the distance to the hazard is within the threshold distance.

In some embodiments, the computer program code is further configured, when executed, to cause the apparatus to cause an alert to be provided to a user, wherein the alert indicates the presence of the hazard in the projected path of the watercraft. Additionally, the computer program code may be further configured, when executed, to cause the apparatus to determine a period of time that has elapsed since causing the alert to be provided to the user, determine if the period of time that has elapsed is greater than a threshold period of time, and cause the watercraft to stop in an instance in which the period of time that has elapsed is greater than the threshold period of time. Additionally or alternatively, the computer program code may be further configured, when executed, to cause the apparatus to receive, in response to the alert, user input indicating a desire to stop the watercraft and cause, in response to receiving the user input, the watercraft to stop before reaching the hazard.

In some embodiments, the marine electronic data is received from at least one of a chart system, a sonar system, a radar system, a position system, or a tracking system. In some embodiments, the marine electronic data is at least one of chart data, sonar data, radar data, positioning data, or tracking data.

Another example embodiment of the present invention provides a system with the apparatus as described above. The system further includes at least one of a sonar system or a radar system. The sonar system is configured to emit one or more sonar beams generally forward of the watercraft, receive return echoes of the one or more sonar beams, and convert the return echoes into sonar data. The sonar system is electrically connected to the apparatus and configured to transmit the sonar data to the apparatus, wherein the marine electronic data includes the sonar data. The radar system is configured to emit one or more radio waves at least generally forward of the watercraft, receive reflected radio waves, and convert the reflected radio waves into radar data. The radar system is electrically connected to the apparatus and configured to transmit the radar data to the apparatus, wherein the marine electronic data includes the radar data.

In another example embodiment of the present invention, a method is provided. The method includes transmitting one or more navigation instructions to at least one motor controller for navigating a watercraft along a route. The method further includes receiving marine electronic data from one or more marine electronic data sources as the watercraft travels along the route. The method further includes determining, based on the marine electronic data, if a hazard is in a projected path of the watercraft based on the route. The method further includes causing, via the at least one motor controller, the watercraft to stop before reaching the hazard in an instance in which the hazard is determined to be in the projected path. Example methods of the present invention may also include additional embodiments as described herein, such as described above with respect to the example apparatus.

In yet another example embodiment of the present invention, a non-transitory computer-readable medium is provided. The non-transitory computer-readable medium comprises of at least one memory device having computer program instructions stored thereon. The computer program instructions are configured, when run by a processor, to transmit one or more navigation instructions to at least one motor controller for navigating a watercraft along a route. The computer program instructions are further configured, when run by a processor, to receive marine electronic data from one or more marine electronic data sources as the watercraft travels along the route. The computer program instructions are further configured, when run by a processor, to determine, based on the marine electronic data, if a hazard is in a projected path of the watercraft based on the route. The computer program instructions are further configured, when run by a processor, to cause, via the at least one motor controller, the watercraft to stop before reaching the hazard in an instance which the hazard is determined to be in the projected path. Example computer-readable medium of the present invention may also include additional embodiments as described herein, such as described above with respect to the example apparatus.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

During normal operation, a watercraft may travel along a projected path (e.g., a route or course). While traveling along a projected path, a watercraft may be collecting, processing, converting, and/or displaying data from a variety of sources. This data may be gathered from a variety of sources including but not limited to: a radar system, a sonar system, a position system, a tracking system, and/or a chart system. This information may be displayed to a human operator (e.g., user) of the watercraft on a screen or display such as a multi-function display ("MFD"). Through the collecting, processing, converting, and/or displaying of data, a determination may be made that a hazard is present in the projected path of the watercraft either above or below the water's surface. This determination may be made by a navigation safety system or by one or more systems incorporating a navigation safety system according to some embodiments discussed herein. Once a hazard is detected, the navigation safety system may cause the watercraft to stop under certain conditions. In many circumstances, ceasing the motion of the watercraft in order to prevent a collision may be more effective (or otherwise preferable) than rerouting the vessel.

Additionally, the navigation safety system may utilize a variety of safety thresholds to determine that the detected hazard is a threat to the safety of the watercraft prior to stopping the watercraft. These threshold values may include one or more of a horizontal distance to the watercraft, a vertical distance (e.g., depth) between the hazard and the watercraft's lowest point, and a velocity at which the watercraft is traveling. Such thresholds may be adjustable and specific to each watercraft. If a hazard is determined to be a true threat to the watercraft by breaching one or more threshold values, the navigation safety system may take action. For example, the navigation safety system may transmit warnings to the operator of the watercraft. In some cases, a warning may include a required response time in which the human operator must respond. The associated time value with this response time may be depend on one or more factors, such as the velocity at which the watercraft is traveling and/or the horizontal distance between the watercraft and the hazard. The human operator of the watercraft may choose to dismiss this notification and continue operation of the watercraft along its projected path if desired. In some embodiments, the navigation safety system may independently stop the watercraft with or without providing a warning to the operator. For example, if the required response time value is exceeded without an operator's response or if the hazard is determined to be too imminent for the operator to respond (e.g., by triggering a closer threshold), the navigation safety system may cease motion of the watercraft to avoid a collision with the hazard. In some embodiments, the human operator of the watercraft, upon receipt of the warning notification indicating an approaching hazard, may provide user input indicating a desire to stop the watercraft or otherwise avoid the hazard.

The watercraft marine electronic device may employ a passage or voyage planning protocol in which the marine electronic device (e.g., via a navigation system) prepares a developed and complete description of its trip from start to finish prior to embarking on its voyage. This planning may utilize methods such as nautical chart navigation, celestial navigation, electronic navigation, dead reckoning, among others to determine the appropriate path for the watercraft as would be understood by one of ordinary skill in the art in light of this disclosure. A safety system or other system of the marine electronic device may transmit one or more navigation instructions to a human operator or autopilot for navigating a watercraft along a route. Additionally, electronic and computer aided navigation may be used by watercraft to determine and assist in maintaining a projected path (e.g., a route or course). As discussed below, radar systems, sonar systems, position systems, tracking systems, and chart systems among others may be utilized to accurately determine the position of a watercraft on its projected path and adjust this projected path as needed to avoid any hazard including other watercraft.

In some embodiments, the marine electronic device may be configured to determine the projected path of the watercraft without the assistance of a passage planning protocol. The projected path may be determined by the marine electronic device without reference to a preset projected path (e.g., a route or course) by calculating the projected path of the watercraft through analyzing the direction the watercraft is traveling (e.g., heading or bearing), the velocity at which the watercraft is traveling, the position the motor is directed, or the position of the wheel (e.g., any human operator driving mechanism).

The watercraft detailed herein may be under manual operation with a human operator or may utilize an autopilot system (e.g., sometimes referenced herein as an "automatic operator"). An autopilot system, as is known in the art, may allow the marine electronic device to maintain a projected course of the watercraft without the need for human intervention. An autopilot system may be used in conjunction with a projected path determined from a passage planning protocol as discussed above, or the autopilot system may include a passage planning protocol. In such a circumstance, the autopilot system may ensure that the watercraft followed the projected path determined for the watercraft without the need of human intervention, such as by controlling one or more motors (via a motor controller) of the watercraft.

Data Sources and Hazard Detection

Figure 1:
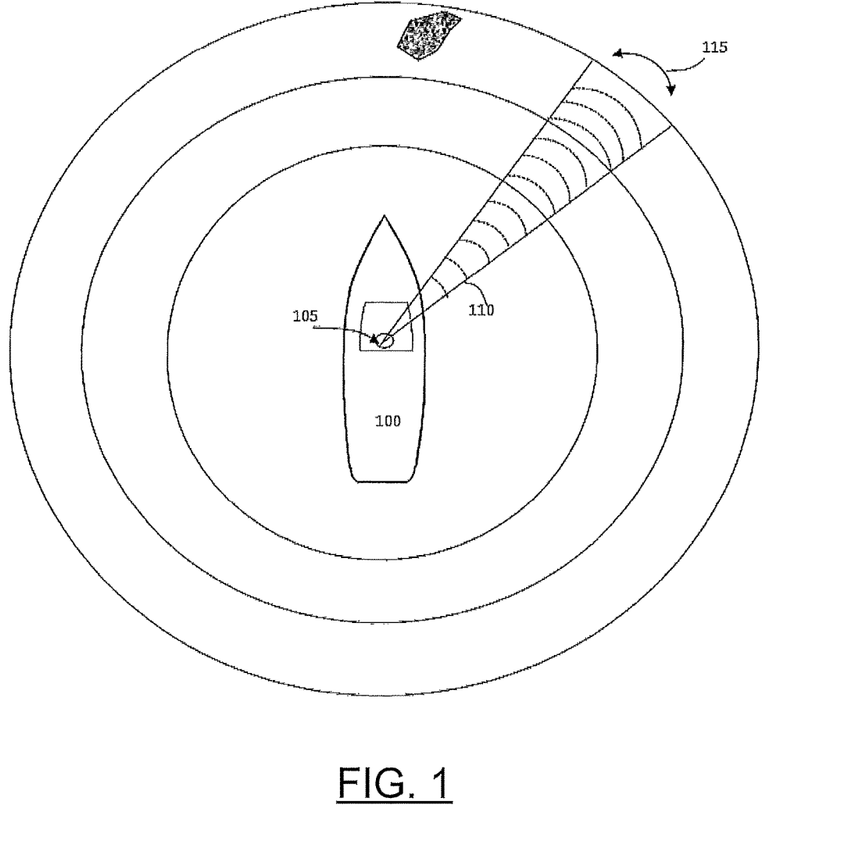
FIG. 1 illustrates a watercraft emitting one or more radar beams, in accordance with some example embodiments discussed herein.

Radar (RAdio Detection And Ranging) systems (e.g., radar system 105 in FIG. 1) may be employed by boaters, sport fishermen, search and rescue personnel, researchers, surveyors, and many others who employ watercraft. With reference to FIG. 1, a watercraft 100 may include a radar system 105. The radar system 105 may be attached to the watercraft 100 and may transmit one or more radar beams 110 in order to determine the location of objects above the water's surface. The one or more radar beams 110 reflect off objects (other watercraft, land masses, or other hazards above the water's surface) and return (as radar returns) to the radar system 105. In some embodiments, the radar system 105 can emit one or more radar beams 110 at varying horizontal beam widths 115, pulse repetition rates, and pulse widths. Each of these parameters contributes to the accuracy of the radar system 105. The raw radar returns may then be converted into electrical energy to form marine electronic data 310 and, more specifically, radar data. This marine electronic data 310 may be received by one or more marine electronic devices (e.g., marine electronic device 300 in FIGS. 3-4), may be processed to determine if a hazard is present in the projected path of the watercraft 100, and may be used to generate an image of the above the surface environment (e.g., a radar image) that may be presented on a display (e.g., screen 305 in FIG. 3-4 or display 601 in FIG. 6).

Though the example illustrated radar beam 110 is shown in two dimensions indicating only a horizontal beam width 115, various other directional and transmission-related values may be varied and applied (e.g., vertical beam width, pulse repetition rate, pulse width, among others) as would be understood by one of ordinary skill in the art in light of the present disclosure. Likewise, while the example illustrated radar system 105 is shown as a 360 degree radar system with a single beam circulating, other orientations/directions (e.g., omni-directional, hemispherical directional, conical, sector, unidirectional sector, lobe switching, among others) are contemplated by embodiments of the present disclosure without limitation.

Radio waves (electromagnetic radiation) employed by radar systems 105 travel at a known speed. Therefore, the time required for transmitted radar beams 110 to return to one or more transducers of the radar system 105 is directly related to the distance between the system and the objects from which the radar beams 110 echo. Moreover, the direction from which the returns are received may indicate the angle to the hazard. Utilizing this information, the marine electronic data 310 gathered from the radar system 105 may be processed to determine if a hazard is present in the projected path of the watercraft 100 (e.g., based on the angle and distance to the hazard).

Figure 2A:
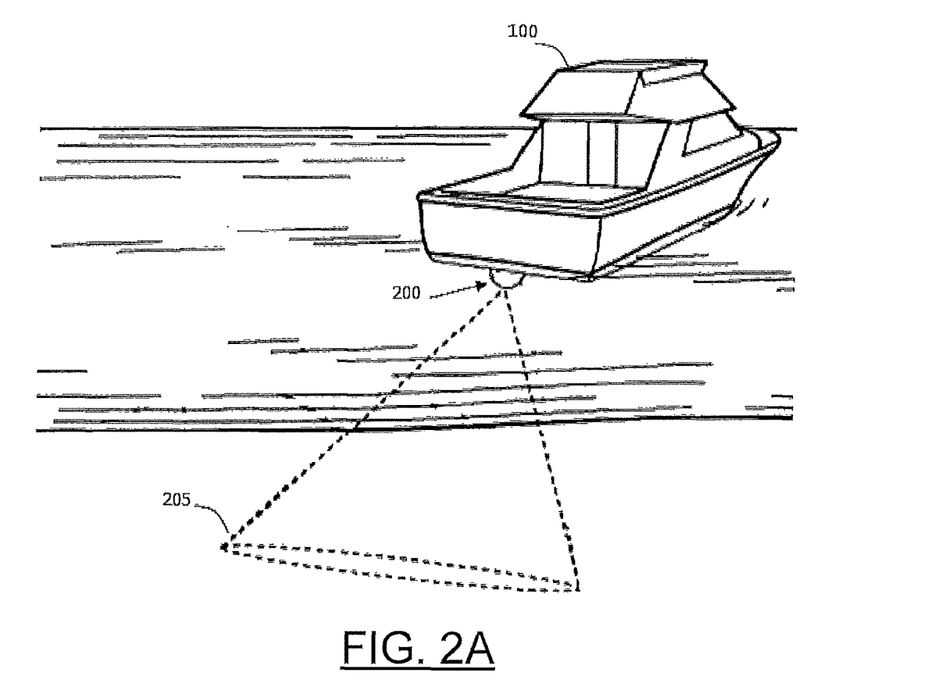
FIGS. 2A and 2B illustrate a watercraft emitting one or more sonar beams, in accordance with some example embodiments discussed herein.
Figure 2B:
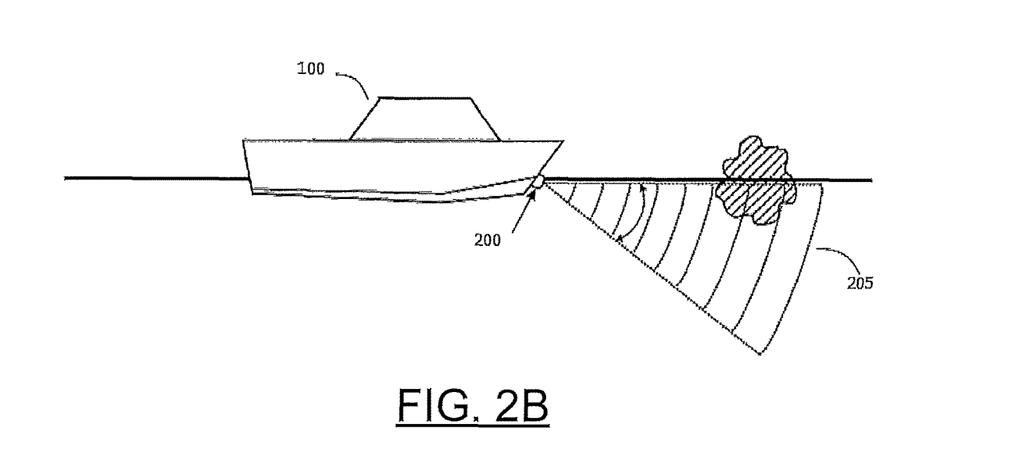

Sonar (SOund Navigation and Ranging) systems may be employed by watercraft marine electronic devices to determine depth and bottom topography, detect fish, and locate other underwater sounding targets. With reference to FIGS. 2A-2B, a sonar system 200 may be attached to the watercraft 100 and may utilize one or more transducers configured to transmit one or more sonar beams 205 into the underwater environment to determine the location of objects below the water's surface. Sonar signals from the one or more sonar beams 205 may reflect off objects (e.g., land masses, or other hazards below the water's surface) and return as sonar returns to one or more transducers of the sonar system 200. The raw sonar returns may then be converted into electrical energy by the transducers to form marine electronic data 310, specifically sonar data. This sonar data may then be received by one or more marine electronic devices (e.g., marine electronic device 300 in FIG. 3) to be processed, such as to generate an image of the underwater environment (e.g., a sonar image) that may be presented on a display (e.g., screen 305 in FIG. 3-4 or display 601 in FIG. 6). In some embodiments, the sonar data may be processed to determine if a hazard is present in the projected path of the watercraft 100.

With reference to FIG. 2A, one embodiment of the illustrated sonar system 200 may be configured so as to transmit the sonar beams 205 generally downwardly from the watercraft. In some embodiments, with reference to FIG. 2B, the illustrated sonar system 200 may be configured so as to transmit the sonar beams 205 generally forward and at least partially downwardly from the watercraft 100. Other orientations/directions of the sonar system 200 are also contemplated by the present disclosure (e.g., rearward facing, downward facing only, side facing only, and combinations thereof, among others without limitation). Likewise, while the example illustrated sonar system 200 is shown with a single sonar beam having a fan-shape corresponding to a linear transducer, other sonar beam shapes (e.g., conical, elliptical, etc.), transducer shapes (e.g. circular, square, etc.), and any number of transducers are contemplated by embodiments of the present disclosure without limitation.

Because the speed of sound in water is calculable and generally constant at a given location and in a given body of water, the time required for transmitted sonar beams 205 to return to the transducer is directly related to the distance between the transducer and the objects, floor, or other reflective surface from which the sonar beams 205 echo. Moreover, the direction to the reflective surface may be determined using the orientation of the one or more transducers and/or other methods of triangulating or beam-steering known in the art. Utilizing this information, the marine electronic data 310 received from the sonar system 200 may be processed to determine if a hazard is present in the projected path of the watercraft 100. Moreover, in some embodiments, the depth of the hazard may be determined based on received sonar data.

A position system, such as Global Positioning Systems ("GPS") (e.g., position system 405 in FIGS. 5 and 6), provides location and time information to positions on earth with line of sight to multiple GPS satellites. GPS has become popular in a number of applications from military to commercial ventures. The GPS satellite system is maintained by the United States government and is made freely accessible to GPS receivers. GPS uses satellites circling the earth on a precise orbit and transmitting data to earth, accounting for various delays, (e.g., ephemeris errors, signal multipath, ionosphere and troposphere delays, among others without limitation) to provide an accurate position of a GPS receiver. This position system 405 may utilize a position sensor that receives a position signal from a satellite positioning system such as GPS. The position signal may then be converted into electrical energy to form marine electronic data 310, specifically position data. This marine electronic data 310 may be processed to determine if a hazard is present in the projected path of the watercraft 100. This positioning data may be received by one or more marine electronic devices (e.g., marine electronic device 300 in FIG. 3) and used to generate an image that may be presented on a display (e.g., screen 305 in FIG. 3 or display 601 in FIG. 6). Although a GPS system is the illustrated example in the present disclosure, any other satellite location systems or position sensors (e.g., the Russian equivalent (GLONASS), the European equivalent (GALILEO), the Chinese equivalent (BeiDou-2), Indian equivalent (GAGAN), (GNSS), or other similar systems without limitation) are contemplated by the present disclosure.

A tracking system, such as Automatic Identification System ("AIS"), is an automated tracking system, utilized by watercraft, that operates by communicating with other nearby watercraft, satellites, and AIS base stations. The tracking system 410 may electronically exchange the unique position, charted course, and velocity between watercraft through the use of transponders. The tracking systems 410 of each watercraft may transmit position, velocity, and projected path information to other transponders in the area, and each tracking system 410 may receive corresponding position, velocity, and projected path information from nearby watercraft. The tracking system may convert the information gathered by the transponder into electrical energy to form marine electronic data 310, specifically tracking data. This tracking data may be received by one or more marine electronic devices (e.g., marine electronic device 300 in FIG. 3) and used to generate an image that may be presented on a display (e.g., screen 305 in FIG. 3 or display 601 in FIG. 6). Each watercraft employing an AIS system is given a maritime mobile service identity ("MMSI") which serves as the unique identifier for that vessel. The closest point of approach ("CPA"), representing the closest separation point between the two boats on their current projected paths, and the time to the closest point of approach ("TCPA") can be calculated from the marine electronic data 310 broadcast from a specific MMSI. Although an AIS system is the illustrated example in the present disclosure, any other vessel to vessel communication, identification, and tracking systems are contemplated by the present disclosure.

Nautical Charts provide a topographical representation of a maritime area. These charts indicate coastlines, hazards, tides, and localized magnetic field irregularities. In order for a nautical chart to be created, a hydrographic survey is conducted of the area to be charted by the official offices of many countries as well as private entities. In addition to paper charts, electronic navigation charts and electronic chart display and information systems ("ECDIS") can be used to store and display the same maritime data. The chart system (e.g., chart system 415 shown in FIGS. 5 and 6) compiles various nautical information from a variety of chart sources and defines this information gathered by the chart system 415 as marine electronic data 310, specifically chart data. This chart data may be received by and/or stored in one or more marine electronic devices (e.g., marine electronic device 300 in FIG. 3) and used to generate an image that may be presented on a display (e.g., screen 305 in FIG. 3 or display 601 in FIG. 6). Additionally, the chart system 415 may create marine charts from marine electronic data 310 gathered from any combination of a radar system 105, sonar system 200, position system 405, and/or tracking system 410 as detailed above. While the chart system 415 is illustrated by an example ECDIS displaying marine electronic data 310, any other chart types (e.g., ENC vector, Raster, NOAA, Admiralty, maps, paper charts, among others) are contemplated by embodiments of the present disclosure. The present disclosure also contemplates that images generated from chart data may have other marine electronic data 310 embedded in the chart such as sonar or radar data. The chart data utilized by the chart system 415 may also be gathered from a memory storage device, internal or external.

In some embodiments, the watercraft may be under manual operation where a human pilot operates the watercraft 100. In some embodiments, the watercraft may utilize an autopilot system (e.g., autopilot 706 shown in FIG. 5). An autopilot system may be employed to maintain a projected course of the watercraft 100 without the need for human intervention. The autopilot may include any self-steering configuration (e.g., wheel mounting, direct drive, tiller pilot, cane to rudder, servo pendulum rudder, sheet-to-tiller, among others) such as through control of one or more motor controllers.

Navigation Safety System

In some embodiments herein, the navigation safety system 500 (e.g., illustrated in block diagram form in FIG. 5) utilized by the watercraft (e.g., watercraft shown in FIG. 1-2B) may generate and/or receive marine electronic data 310 using one or more of: a radar system 105, a sonar system 200, a position system 405, a tracking system 410, or a chart system 415. The data provided by these one or more systems (e.g., systems 105, 200, 405, 410, 415 shown in FIGS. 5 and 6) may also be used to determine if a hazard is present in the path of the watercraft. Upon recognition of a hazard, the navigation system may cause the watercraft 100 to relay warnings and/or cease movement as described herein.

When a watercraft is traveling along a projected path (e.g., a course or route), the watercraft may encounter hazards. A hazard may be any dangerous condition, found both above and below the water's surface, with which the watercraft desires to avoid collision. For example, a hazard may be any of an above-water land mass, shallow water, other watercraft, floating objects, or any other object or structure with which the watercraft might collide. The marine electronic data 310 gathered from the radar system 105, sonar system 200, position system 405, tracking system 410, and chart system 415 may be processed to determine if a hazard is present in the project path of the watercraft 100. For example, in some embodiments, the closest point of approach ("CPA") and time to closest point of approach ("TCPA") can be calculated from the marine electronic data 310, or may be embodied in the marine electronic data 310 from AIS systems. The marine electronic device 310 may identify the hazard as being in the projected path where the CPA is zero or close to zero (e.g., within the watercraft's width of zero). This processing and hazard determination may occur at the centralized navigation safety system or by any of the respective systems and transmitted to a centralized location.

When a hazard is detected, the navigation safety system 500 may employ a variety of safety thresholds to conclude that the determined hazard is a threat to the safety of the watercraft before stopping the watercraft. These threshold values may include at least one of a horizontal distance between the hazard and the watercraft, a vertical distance (e.g., depth) between the hazard and the watercraft's lowest point, a straight-line distance between the hazard and the watercraft, or the velocity at which the watercraft is traveling in comparison with one of the aforementioned distances. Such thresholds may be adjustable and specific to each watercraft. In some embodiments, the thresholds may be tested either before or after determining that a hazard is in the projected path of the watercraft. In some embodiments, these safety thresholds may be continually tested by the navigation safety system whether or not a hazard has been detected upon the projected path of the watercraft.

Embodiments of the navigation safety system 500 utilized by the watercraft 100 may trigger the stoppage of the watercraft 100 when the hazard is at or within a threshold distance of the watercraft. This threshold distance may incorporate any distance between the watercraft 100 and a determined hazard including both horizontal and vertical distance values. For example, a sonar system may detect the depth of the hazard in the water, and the threshold distance may include the minimum operating depth of the watercraft. In another example embodiment, a radar or sonar system may detect a horizontal distance to the hazard relative to the surface of the water, and the threshold may include a minimum safe stopping distance. The navigation safety system 500 may utilize a threshold distance value to ensure that the system does not stop the watercraft 100 when the presence of a hazard is not of concern. For example, a determined hazard may be found to be along the projected path of the watercraft 100, and the horizontal distance between the hazard and the watercraft 100 may be large enough that the hazard is not yet a danger to the watercraft 100 (e.g., if operator has sufficient time to receive notice and avoid the hazard on their own).

There may be some instances when the watercraft 100 is intentionally near hazards such as entering or leaving a port or marina, approaching another vessel for docking, traveling through canals or locks, or any other close-quarters maneuvering. In these instances, a lower threshold distance value (e.g., either vertical, horizontal, or linear) may be either manually or automatically applied to ensure only true hazards are avoided by the navigation safety system 500. The hazard detected by the navigation safety system 500 may not cause the cessation of the watercraft's motion so long as the threshold distance 520 (referenced in FIG. 4) has not been breached.

As indicated by the above example, the navigation safety system 500 may employ a variable threshold distance value 520. In such an embodiment, the threshold distance value may be changeable by a manual operator or automatically as described herein. The human operator of the watercraft may be allowed to alter the threshold distance value in circumstances in which the watercraft 100 is intentionally close to a determined hazard. The variable threshold distance value 520 may also be automatically adjustable by the navigation safety system 500. In such an embodiment, the navigation safety system 500 may determine an appropriate threshold distance value 520 based upon the current metrics associated with the watercraft (e.g., velocity, stopping distance, wind speed, current direction, current distance to the hazard, velocity of the hazard if applicable, among others). For example, the navigation safety system 500 may scale the threshold distance value 520, either continuously or lockstep, based upon the velocity, stopping distance, or any other metric associated with the watercraft or hazard.

In embodiments having a sonar system 200, embodiments of the navigation safety system 500 may also employ a threshold distance 520 which corresponds to a vertical distance between the watercraft 100 and an underwater hazard. Similarly, in embodiments having a radar system 105, embodiments of the navigation safety system 500 may also employ a threshold distance 520 which corresponds to a vertical distance between the watercraft 100 and an above-water hazard (e.g., a bridge or dock). The navigation safety system 500 may utilize a minimum threshold distance value to ensure that the system does not cease the motion of the watercraft 100 when the presence of a hazard is not of concern for the watercraft operator, whether manual or autopilot. For example, a determined hazard may be found to be along the projected path of the watercraft 100, and the depth or vertical distance between the hazard and the watercraft 100 may be greater than the maximum height (e.g., in radar embodiments) or minimum operating depth (e.g., in sonar embodiments) that the watercraft 100 will not come into contact with hazard. Where a hazard is determined by the navigation safety system to be taller than the watercraft 100 or deeper than the draft depth of the watercraft 100, respectively, the threshold distance value 520 will ensure that the watercraft continues on its projected path. As watercraft come in various sizes and draft depths, this vertical threshold distance value 520 may also be different for each watercraft employing a navigation safety system 500, and the characteristics of each specific watercraft may be preprogrammed, downloaded, or input into the marine electronic device.

Embodiments of the navigation safety system 500 utilized by the watercraft 100 may trigger the stoppage of the watercraft 100 when the hazard is at or within a threshold time to closest approach. This threshold may incorporate any distance between the watercraft 100 and a determined hazard, including both horizontal and vertical distance values, and the velocity of the watercraft 100. For example, a radar or sonar system may detect a horizontal distance to a hazard relative to the surface of the water and the marine electronic device may detect the velocity of the watercraft 100. From this information, the navigation safety system 500 may calculate the time until the closest approach to the hazard. Thus, in some embodiments, the navigation safety system 500 may consider a component of the velocity of the watercraft in a direct line towards the hazard rather than an absolute velocity of the watercraft. The navigation safety system 500 may utilize a threshold time to closest approach value to ensure that the system does not stop the watercraft 100 when the presence of a hazard is not of concern for the watercraft operator, whether manual or autopilot.

Embodiments of the navigation safety system 500 utilized by the watercraft 100 may employ a threshold velocity 525. The navigation safety system 500 may utilize a maximum threshold velocity value in addition to one or more of the above-described thresholds to ensure that the system does not cease the motion of the watercraft 100 when the presence of a hazard is of little or no risk to the watercraft 100 due to the low velocity of the watercraft 100. For example, when the watercraft 100 is stopped, idling, or being towed, the navigation safety system 500 may recognize the towing vessel, piers, marinas, ports, and any other nearby obstacles as hazards, and/or may consider the current throttle position and watercraft speed (e.g., as determined by a tachometer, speedometer, or position system). This threshold velocity 525 may also be used to allow motion in situations wherein a hazard is within the threshold distance 520 or threshold time to closest approach value. In such a circumstance, the threshold velocity 525 would ensure that a watercraft under tow or fishing near underwater hazards would remain in motion even though a threshold distance 520 or threshold time to closest approach 550 had been breached. This hazard detected by the navigation safety system 500 may not cause the cessation of the watercraft's motion so long as the threshold velocity 525 has not been breached.

In response to the determination that a hazard is present by the navigation safety system 500 analyzing marine electronic data 310 acquired by any one or combination of a radar system 105, a sonar system 200, a position system 405, a tracking system 410, or a chart system 415, a warning alert may be provided to the user audibly and/or may display upon a marine electronic device 300. The alert indicates the presence of a hazard in the projected path of the watercraft 100. Upon transmission of a warning alert to the user, various responses are available and hereafter described.

In response to the determination that a hazard is present and transmission of a warning alert to a human watercraft operator, the human user may manually respond to the warning alert. In some embodiments, the manual operator may dismiss the warning alert, and the watercraft 100 may continue upon its projected path regardless of the hazard. The operator may also be presented with the option (e.g., via a voice command, selection on a screen, among others) to transmit a stop instruction to cause the motion of the watercraft 100 to stop. The navigation safety system 500 may, upon receiving instruction from the manual operator, transmit a stop instruction to cease the motion of the watercraft 100.

The warning alert transmitted by the navigation safety system 500 may be transmitted to a centralized marine electronic device 300 or may be transmitted to any remote device connected to the navigation safety system 500. For example, a warning alert may be transmitted to a user's cellphone or another marine electronic device connected to the navigation safety system 500. This warning alert may be presented to the human operator as a printed message on a display, as an audible alert, as a flashing indicator on the marine electronic device, among others. In some embodiments, the warning may be transmitted to a remote device, such as a wireless display or cellular phone. The present disclosure contemplates any alert or notification mechanism as would be understood by one of ordinary skill in the art in view of the present disclosure.

In another embodiment of the present disclosure, no warning alert may be provided to the user or autopilot operator. In such an embodiment, upon deteiniination that a hazard is present in the projected path of the watercraft 100 and, in some embodiments, if one or more thresholds are satisfied, the navigation safety system 500 may transmit a stop instruction to cause the motion of the watercraft 100 to stop. Without a warning alert, the navigation safety system 500 may determine the time and distance from the hazard in which to transmit the stop instruction to avoid collision between the watercraft 100 and the hazard.

In some embodiments, after transmitting a warning alert, the navigation safety system 500 may wait for a threshold period of time 545. If no response is received from a manual operator within a threshold period of time 545, the navigation safety system 500 may transmit a stop instruction to cease motion of the watercraft 500. In some embodiments, this threshold period of time 545, may be commonly used when the watercraft 100 is operated by an autopilot system. The navigation safety system 500 may, upon receiving instruction from the manual operator, transmit a stop instruction to cease the motion of the watercraft 100.

In some embodiments, the navigation safety system 500, upon the transmission of a warning alert to the operator of the watercraft 535, may use a second distance threshold 535 or a second threshold time to closest approach that triggers one or more additional safety measures. If the hazard is within a second, closer distance threshold 535 or second time to closest approach, in which no response from an operator has occurred, the navigation safety system 500 may transmit a stop instruction 545 to cease the motion of the watercraft 100. For example, the second threshold time to closest approach value may operate as a minimum safe distance from the hazard for which, upon being breached, the navigation safety system transmits a stop instruction to cease the motion of the watercraft 100.

In some embodiments, the watercraft 100 may have a motor controller with the ability to cut power to the watercraft's motor. This motor controller may be housed inside the motor of the watercraft 100 or separately from the motor (e.g., in the marine electronic device) and may be connected to the watercraft's marine electronics. Upon receiving a stop instruction from the navigation safety system 500, the motor controller may cut power to the watercraft's motor to cause the motion of the watercraft 100 to stop. Although the illustrated example is one of cutting power to a motor controller, the motor controller may stop the motion of the watercraft by any means (e.g., placing the drivetrain in neutral, dropping an anchor, reducing throttle, among others) each of which is contemplated by embodiments of the present disclosure without limitation. In some embodiments, the navigation safety system 500 of the marine electronic device 300 may be electrically connected to an existing motor controller or motor shutoff.

Figure 3:
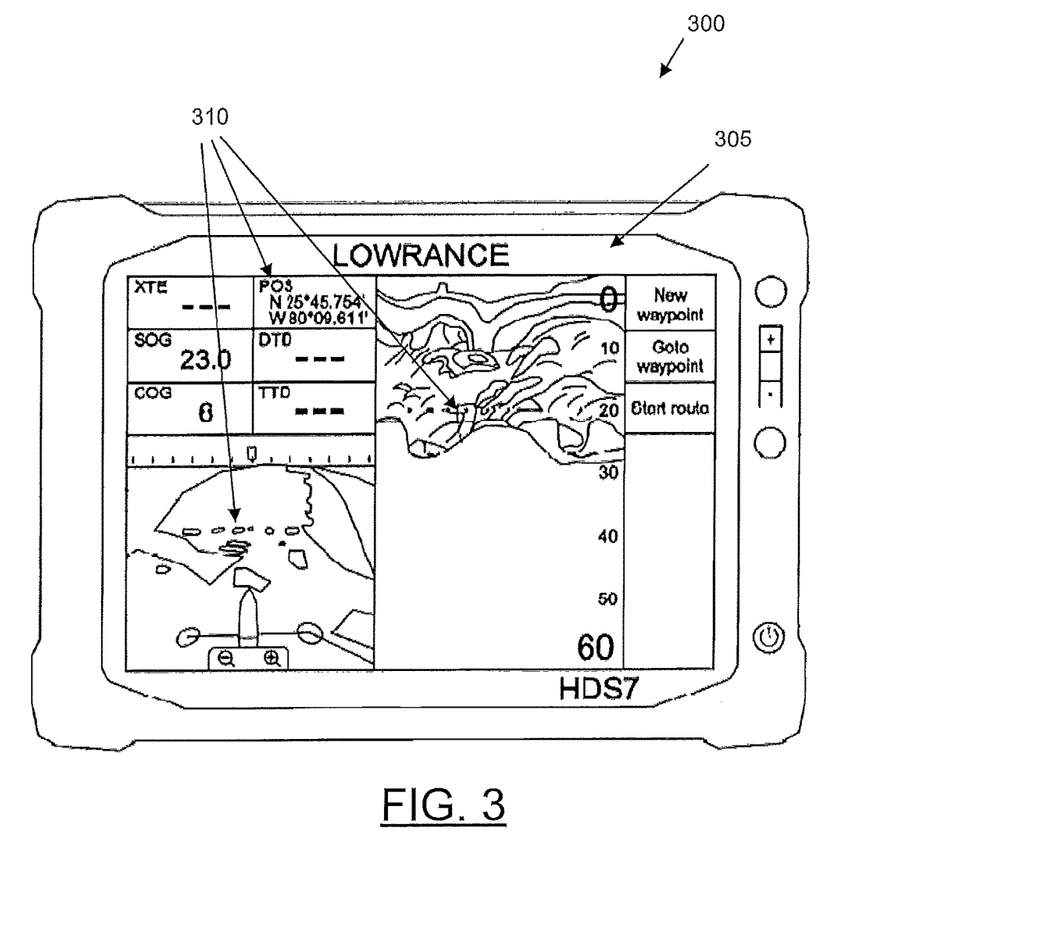
FIG. 3 shows an example marine electronic device, in accordance with some example embodiments discussed herein.

With reference to FIG. 3, an example marine electronic device 300 is shown. The marine electronic device 300 may include a screen 305 and may have one or more buttons and/or a touchscreen for controlling the various systems. The marine electronic device 300 may display marine electronic data 310 such as the radar data, sonar data, position data, tracking data, chart data, or other features and functions. FIG. 3 shows the marine electronic data 310 displayed as an image on the screen 305 of the marine electronic device 300. The marine electronic device 300 may also display a warning alert and allow for user input in response to a warning alert sent by the navigation safety system 500.

Exemplary Architecture

Implementations of various technologies described herein may be operational with numerous general purpose or special purpose computing system environments or configurations. Examples of computing systems, environments, and/or configurations that may be suitable for use with the various marine electronic device technologies described herein include, but are not limited to, personal computers, server computers, hand-held or laptop devices, multifunction displays, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices. Further, each program module and system may be implemented in its own way, and all need not be implemented in the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

Figure 6:
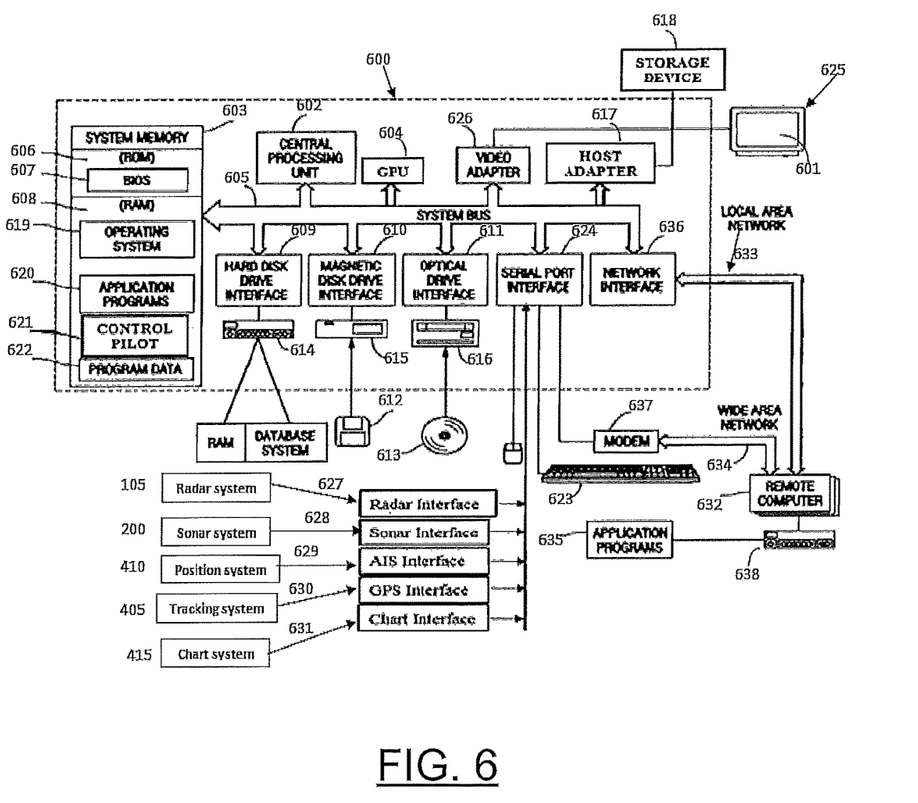
FIG. 6 shows a block diagram illustrating a schematic of an example computing system into which various techniques presented herein may be implemented.

FIG. 6 illustrates a schematic diagram of a computing system 600 in which the various technologies described herein may be incorporated and practiced. Although the computing system 600 may be a console computing device, other configurations or systems (e.g., a handheld device, personal digital assistant, a server computer, electronic device/instrument, laptop, tablet, navigation system, multifunction display, or marine electronics device, among others) may be used.

The computing system 600 may include a central processing unit ("CPU") 602, a system memory 603, a graphics processing unit ("GPU") 604 and a system bus 605 that couples various system components including the system memory 603 to the CPU 602. Although only one CPU 602 is illustrated in FIG. 6, it should be understood that in some implementations the computing system 600 may include more than one CPU 602.

The CPU 602 can include a microprocessor, a microcontroller, a processor, a programmable integrated circuit, or a combination thereof. The CPU 602 can comprise an off-the-shelf processor such as a Reduced Instruction Set Computer (RISC™), or a Microprocessor without Interlocked Pipeline Stages (MIPS™) processor, or a combination thereof. The CPU 602 can also comprise a proprietary processor. The CPU 602 may be configured to analyze electrical signals communicated thereto to provide radar data, sonar data, position data, tracking data, or chart data indicative to the size, location, shape, depth, etc. of objects detected by any of the radar, sonar, position, tracking, or chart systems respectively. By way of example, the CPU 602 may be configured to receive radar return data and process the radar return data to generate radar image data for display to an operator (e.g., on display 601). Additionally, each system (e.g., radar system, sonar system, position system, tracking system, and chart system) may have a CPU or other processing capabilities in order to process return data to generate image data that may be transmitted to a centralized location for display.

The GPU 604 may be a microprocessor specifically designed to manipulate and implement computer graphics. The CPU 602 may offload work to the GPU 604. The GPU 604 may have its own graphics memory, and/or may have access to a portion of the system memory 603. As with the CPU 602, the GPU 604 may include one or more processing units, and each processing unit may include one or more cores.

The CPU 602 can provide output data to a GPU 604. The graphics processor 604 can generate graphical user interfaces that present the output data. The GPU 604 can also provide objects, such as menus, in the graphical user interface ("GUI"). A user can provide inputs by interacting with the objects. The GPU 604 can receive the inputs from interaction with the objects and provide the inputs to the CPU 602.

The system bus 605 may be any of several types of bus structures, including a memory bus or memory controller, a peripheral bus, and a local bus using any of a variety of bus architectures. By way of example, and not limitation, such architectures include Industry Standard Architecture ("ISA") bus, Micro Channel Architecture ("MCA") bus, Enhanced ISA ("EISA") bus, Video Electronics Standards Association ("VESA") local bus, and Peripheral Component Interconnect ("PCI") bus also known as Mezzanine bus. The system memory 603 may include a read only memory ("ROM") 606 and a random access memory ("RAM") 608. A basic input/output system ("BIOS") 607, containing the basic routines that help transfer information between elements within the computing system 600, such as during start-up, may be stored in the ROM 606.

The computing system 600 may further include a non-transitory memory, such as a hard disk drive interface 609 for reading from and writing to a hard disk 614, a magnetic disk drive 615 for reading from and writing to a removable magnetic disk 612, and an optical disk drive 616 for reading from and writing to a removable optical disk 613, such as a CD ROM or other optical media. The hard disk 614, the magnetic disk drive 615, and the optical disk drive 616 may be connected to the system bus 605 by a hard disk drive interface 609, a magnetic disk drive interface 610, and an optical drive interface 611, respectively. The drives and their associated computer-readable media may provide nonvolatile storage of computer-readable instructions, data structures, program modules and other data for the computing system 600. The system memory 603, drives, and associated nonvolatile storage may be configured to store instructions, computer program code, marine electronic data 310 (e.g., radar data, sonar data, position data, tracking data, and chart data, among others), and other data associated with these respective systems in a non-transitory computer readable medium for use, such as by the CPU 602.

Although the computing system 600 is described herein as having a hard disk interface 609, a removable magnetic disk 612 and/or a removable optical disk 613, it should be appreciated by those skilled in the art that the computing system 600 may additionally or alternatively include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM 608, ROM 606, erasable programmable read-only memory ("EPROM"), electrically erasable programmable read-only memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing system 600. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 600 may also include a host adapter 617 that connects to a storage device 618 via a small computer system interface ("SCSI") bus, a Fibre Channel bus, an eSATA bus, or using any other applicable computer bus interface. Combinations of any of the above may also be included within the scope of computer readable media.

A number of program modules may be stored on the hard disk 614, magnetic disk 612, optical disk 613, ROM 606 or RAM 608, including an operating system 619, one or more application programs 620, control pilot 621, and program data 622. The control pilot 621 may include information pertaining to the operation of an autopilot system. In certain implementations, the hard disk 614 may include a database system. The database system could record, for example, recorded points. The application programs 620 may include various mobile applications ("apps") and other applications configured to perform various methods and techniques described herein. The operating system 619 may be any suitable operating system that may control the operation of a networked personal or server computer.

A user may enter commands and information into the computing system 600 through input devices such as buttons 623. These and other input devices may be connected to the CPU 602 through a serial port interface 624 coupled to system bus 605, but may be connected by other interfaces, such as a parallel port, game port, or a universal serial bus ("USB").

Additionally, the user can enter inputs through a monitor 625. In certain implementations, the display 601 can be sensitive to touching by a finger, while in other implementations, the display 601 can be sensitive to the body heat from the finger. The display 601 detects placement and movement of the user's fingers and provides signals that are indicative of such placement and movement to the CPU 602. Additionally, the display 601 detects user interactions with the objects provided by the GPU 604 and provides signals that are indicative of the user interactions with the objects. The monitor 625 may also be connected to system bus 605 via an interface, such as a video adapter 626.

The computing system 600 may also have a radar interface 627, a sonar interface 628, an AIS interface 629, a GPS interface 630, and/or a chart interface 631 connected to the serial port interface 624 and system bus 605. The radar interface 627 may be operably connected to a radar system 105. The radar interface 627 may receive signals from the radar system 105, and convert the signals to a data format that is compatible with the CPU 602. The sonar interface 628 may be operably connected to a sonar system 200. The sonar interface 628 may receive signals from the sonar system 200, and convert the signals to a data format that is compatible with the CPU 602. The AIS interface 629 may be operably connected to a tracking system 410. The AIS interface 629 may receive signals from the tracking system 410, and convert the signals to a data format that is compatible with the CPU 602. The GPS interface 630 may be operably connected to a position system 405. The GPS interface 630 may receive signals from the position system 405, and convert the signals to a data format that is compatible with the CPU 602. The chart interface 631 may be operably connected to a chart system 415. The chart interface 631 may receive signals from the chart system 415, and convert the signals to a data format that is compatible with the CPU 602. As mentioned in discussion of the data sources above, the use of the terms GPS and AIS are for illustrative examples and naming only and include any position system and tracking system respectively. Additionally or alternatively, the radar system 105, sonar system 200, position system 405, tracking system 410, and/or chart system 415 may be integral with the functions of the marine electronic device 600 or may be electrically connected to the marine electronic device by any means (e.g., LAN/WLAN).

In any of the embodiments, the display 601 may present one or more sets of marine electronic data 310 (or images generated from the one or more sets of data). Such marine electronic 310 includes radar data, sonar data, position data, tracking data, chart data, weather data, or any other type of information relevant to the watercraft 100. In some embodiments, the display 601 may be configured to present such marine electronic data 310 simultaneously as one or more layers or in split-screen mode. In some embodiments, the user or operator may select any of the possible combinations of the marine electronic data 310 for display.

Further, the computing system 600 may operate in a networked environment using logical connections to one or more remote computers 632 (e.g., hand-held devices, mobile phones, etc.). The logical connections may be any connection that is commonplace in offices, enterprise-wide computer networks, intranets, and the Internet, such as a wired or wireless local area network ("LAN") 633 and a wide area network ("WAN") 634. The remote computers 632 may be another computer, a server computer, a router, a network PC, a marine electronic device, a peer device or other common network node, and may include many or all of the elements describes above relative to the computing system 600. The remote computers 632 may also each include application programs 635 similar to that of the computer action function.

When using a LAN 633 networking environment, the computing system 600 may be connected to or broadcast the local network 633 through a network interface or adapter 636. When used in a WAN 634 networking environment, the computing system 600 may include a wireless modem 637 or any other means for establishing communication over a wide area network 634. The modem 637 may be connected to the system bus 605 via the serial port interface 624. In a networked environment, program modules depicted relative to the computing system 600, or portions thereof, may be stored in a remote memory storage device 638. It will be appreciated that the network connections shown are exemplary and other means of establishing a communications link between the computers may be used. For example, the display 601 may be connected to the navigation safety system 500 over a wireless connection.

The network interface 636 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 632.

In certain implementations, at least certain parts or the entire computing system 600, the monitor 625, and buttons 623, can be integrated into a marine electronic device 300 (shown in FIG. 3). The marine electronic device 300 may include a CPU 602, a system memory 603, a user interface 135, a display 601, and one or more data sources (e.g., radar system 105, sonar system 200, position system 405, tracking system 410, chart system 415, etc.), and a network interface 636. Two or more of the components may be integrated into a single module or component (e.g., the display 601 may also be a user interface generated by the GPU 604).

Figure 5:
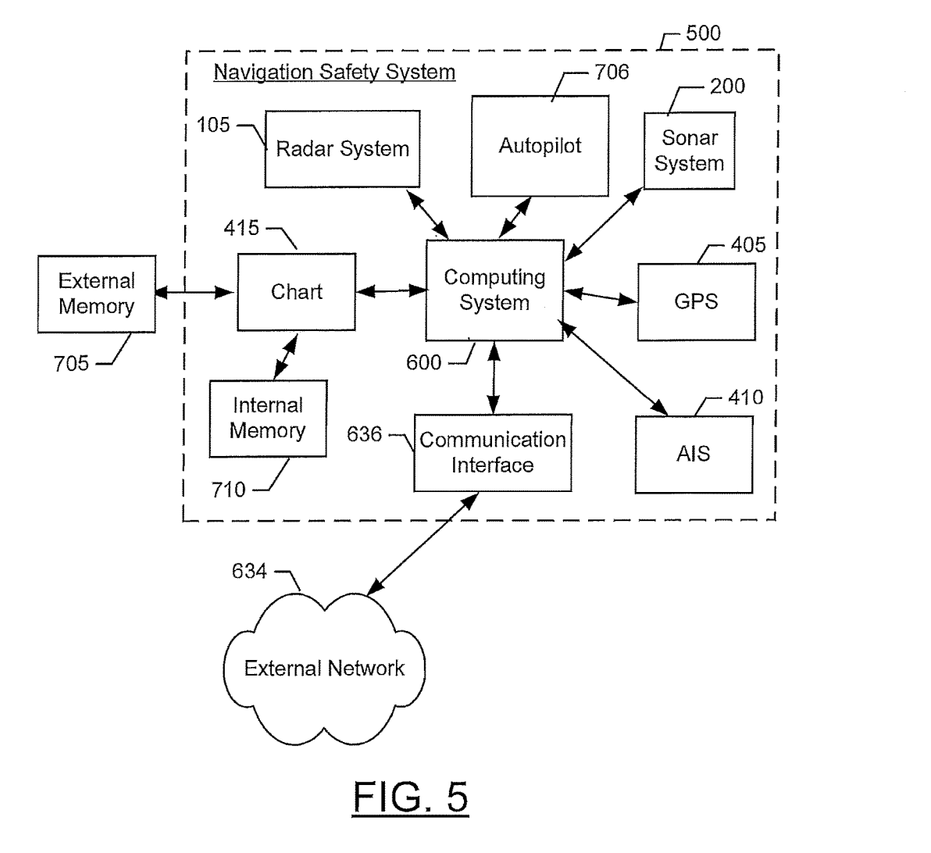
FIG. 5 shows an example navigation safety system, in accordance with some example embodiments discussed herein.

FIG. 5 illustrates a schematic diagram and embodiment of the navigation safety system 500 in which the various technologies described herein may be incorporated and practiced. Although the computing system 600 may be a console computing device, other configurations or systems (e.g., a handheld device, personal digital assistant, a server computer, electronic device/instrument, laptop, tablet, navigation system, or marine electronics device, among others) may be used.

The navigation safety system 500 may include a computing system 600 electrically connected to and/or including at least one of a radar system 603, sonar system 200, position system 405 such as GPS, tracking system 410 such as AIS, and chart system 415. Although only one computing system is illustrated in FIG. 5, it should be understood that in some implementations the navigation safety system 500 may include more than one computing system or any other element capable of processing marine electronic data 310. The navigation safety system 500 may also include a network interface 636 through with the computing system 600 may be connected to a wide area network 634. The chart system 415 utilized by the navigation safety system 500 may include both internal and/or external memory options, 710 and 705 respectively, to allow storage of various charts, maps, etc.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface ("API"), reusable controls, and the like. Such programs may be implemented in a high level procedural or object oriented programming language to communicate with a computing system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the claims is not necessarily limited to the specific features or acts described above. Rather, the specific features and acts described above are disclosed as example forms of implementing the claims.

Example Flowcharts and Operations

Embodiments of the present disclosure provide methods, apparatus, and computer-readable media for providing a navigation safety system wherein detection of a hazard may cause the watercraft to cease motion to prevent collision. Various examples of the operations performed in accordance with embodiments of the present disclosure will now be provided with reference to FIG. 4.

Figure 4:
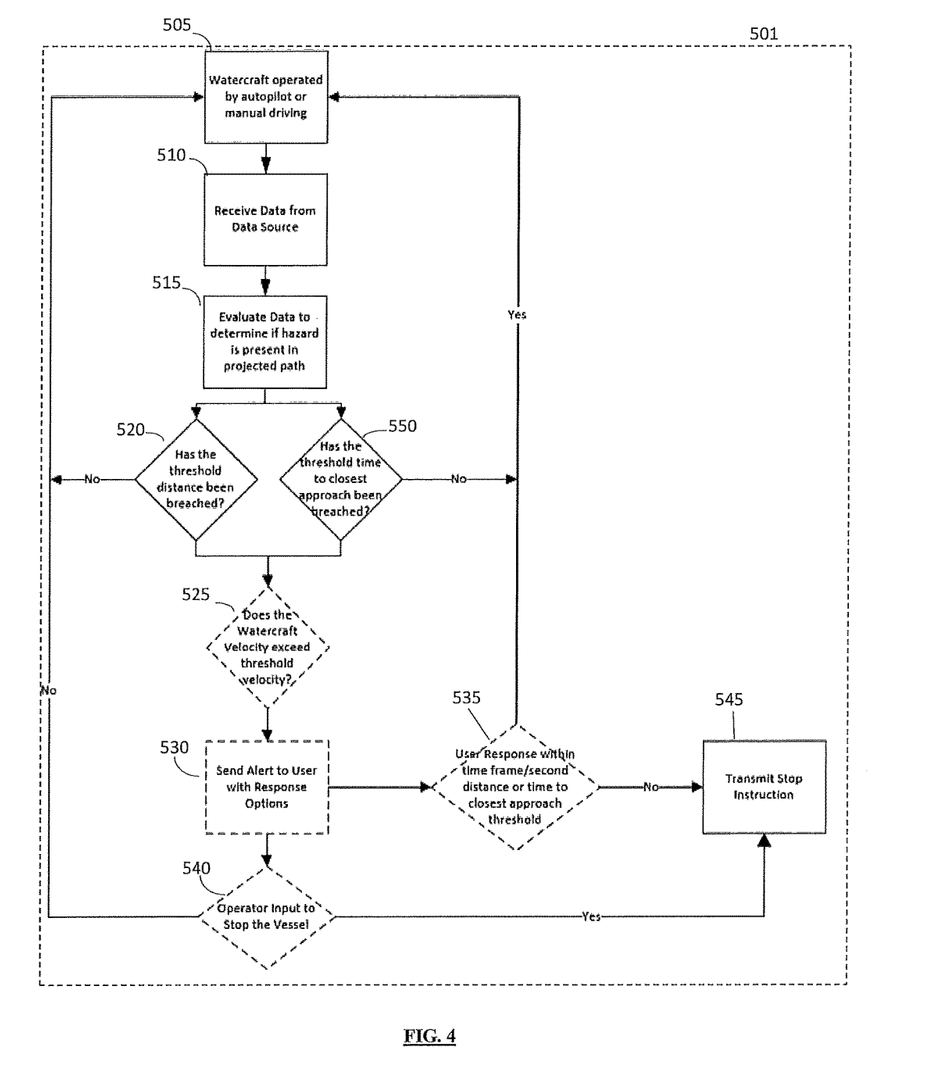
FIG. 4 shows an example navigation safety system flow chart, in accordance with some example embodiments discussed herein.

FIG. 4 illustrates a flowchart of an example method 501 for navigation safety, hazard detection, and collision avoidance according to an example embodiment. The operations illustrated in and described with respect to FIG. 4 may, for example, be performed by, with the assistance of, and/or under the control of one or more of the CPU 602, system memory 603, network interface 636, user interface generated by the GPU 604, display 601, and/or radar system 105, sonar system 200, position system 405, tracking system 410, or chart system 415 each as shown in FIG. 6.

In the example embodiment, the watercraft may initially be under operation via an autopilot 505. The navigation safety system (e.g., navigation safety system 500 in FIG. 5) may receive marine electronic data 310 from marine data sources 510. These marine data sources may include a radar system 105, a sonar system 200, a position system 405, a tracking system 410, and a chart system 415, among others. The data received from the listed systems may be converted to radar data, sonar data, position data, tracking data, and chart data by their respective systems or by a centralized computing system 600 or processor. This data, collectively marine electronic data 310, may be consistently evaluated by the navigation safety system 500. The navigation safety system 500 may determine that the hazard is present in the project path of the watercraft 515 through evaluation of one or any combination of the embodied systems. This evaluation may be performed by, with the assistance of, and/or under the control of one or more of the CPU 602, system memory 603, network interface 636, user interface generated by the GPU 604, display 601, and/or radar system 105, sonar system 200, position system 405, tracking system 410, or chart system 415 each as shown in FIG. 6.

Upon determination that a hazard is present 515 in the projected path of the watercraft 100, the navigation safety system 500 may determine if the hazard is within one or more thresholds to determine if a warning alert should be sent to the operator, whether manual or autopilot. The navigation safety system 500 may determine the distance to the hazard, vertical, horizontal, or any combination thereof, and determine if this distance to the hazard is within a threshold distance corresponding to a minimum safe distance 520 for the watercraft 100. If the distance to the hazard is not within the threshold distance value, the navigation safety system may continue operation by the operator, manual or autopilot. These determinations may be performed by, with the assistance of, and/or under the control of one or more of the CPU 602, system memory 603, network interface 636, user interface generated by the GPU 604, display 601, and/or radar system 105, sonar system 200, position system 405, tracking system 410, or chart system 415 each as shown in FIG. 6.

The navigation safety system 500 may determine the time to closest approach and determine if this value is within a threshold time to closest approach 550 corresponding to a minimum safe value for the watercraft 100. If the time to closest approach is not within the threshold time to closest approach value, the navigation safety system may continue operation by the autopilot. These determinations may be performed by, with the assistance of, and/or under the control of one or more of the CPU 602, system memory 603, network interface 636, user interface generated by the GPU 604, display 601, and/or radar system 105, sonar system 200, position system 405, tracking system 410, or chart system 415 each as shown in FIG. 6.

The navigation safety system 500 may determine the velocity of the watercraft 100 in addition to one of the aforementioned thresholds and determine if that velocity exceeds a threshold velocity corresponding to a maximum safe velocity 525 for the watercraft 100 with respect to a distance value between the hazard and the watercraft. If the velocity of the watercraft 100 does not exceed this threshold velocity value, the navigation safety system 500 may disregard the hazard and continue operation by an operator, manual or autopilot. In some embodiments, the navigation safety system 500 may check the velocity threshold 525 prior to applying the distance 520 or time to closest approach thresholds. In some embodiments, the navigation safety system 500 may check the velocity threshold 525 prior to evaluating the marine electronic data 515 to determine if the hazard is in the projected path of the watercraft. In some embodiments, the navigation safety system may check the threshold distance 520 and/or threshold time to closest approach prior to checking the threshold velocity 525. In some embodiments, the navigation safety system may check the threshold distance 520 and/or threshold time to closest approach after to checking the threshold velocity 525. In some embodiments, exceeding the threshold velocity 525 may activate the navigation safety system 500, such that the system is deactivated until a maximum safe velocity is breached.

In some embodiments having a threshold velocity, if the threshold velocity is exceeded 525 by the watercraft 100 and the threshold distance 520 or threshold time to closest approach 550 is breached by the hazard, then the navigation safety system 500 may transmit a warning alert 530 to the operator of the watercraft, whether manual or autopilot. This warning alert transmission may be performed by, with the assistance of, and/or under the control of one or more of the CPU 602, system memory 603, network interface 636, user interface generated by the GPU 604, display 601, and/or radar system 105, sonar system 200, position system 405, tracking system 410, or chart system 415 each as shown in FIG. 6.

The human operator of the watercraft may receive an alert 530 when the one or more thresholds are breached may then be presented with an option to request to stop the watercraft 540. If the operator inputs a request to stop to the watercraft 540 (e.g., voice command, touch screen input, etc.), the navigation safety system 500 may transmit a stop instruction 545 to cease the motion of the watercraft 100. This cessation of motion may be accomplished by the motor controller via any means (e.g., cutting motor power, placing watercraft in neutral, dropping an anchor, among others) each of which is contemplated by embodiments of the present disclosure discussed herein. The operator of the watercraft 100 may dismiss the warning alert 535 and the navigation safety system 500 will disregard the hazard and continue operation. This transmission of a stop instruction may be performed by, with the assistance of, and/or under the control of one or more of the CPU 602, system memory 603, network interface 636, user interface generated by the GPU 604, display 601, and/or radar system 105, sonar system 200, position system 405, tracking system 410, or chart system 415 each as shown in FIG. 6.

The navigation safety system 500, upon the transmission of a warning alert to the operator of the watercraft 535, may determine a period of time, a second distance threshold 535, or a second threshold time to closest approach that has elapsed from the transmission of the warning alert. If this period of time exceeds a threshold period of time or the hazard is within a second, closer distance threshold 535 or second time to closest approach, in which no response from an operator has occurred, the navigation safety system 500 may transmit a stop instruction 545 to cease the motion of the watercraft 100. If a response from the human operator has occurred 535, the navigation safety system may disregard the hazard and continue operation by an operator, manual or autopilot. This cessation of motion may be accomplished by any means (e.g., cutting motor controller power, placing watercraft in neutral, dropping an anchor, among others) each of which is contemplated by embodiments of the present disclosure. This transmission of a stop instruction may be performed by, with the assistance of, and/or under the control of one or more of the CPU 602, system memory 603, network interface 636, user interface generated by the GPU 604, display 601, and/or radar system 105, sonar system 200, position system 405, tracking system 410, or chart system 415 each as shown in FIG. 6. As discussed above, in some embodiments, no warning alert may be transmitted.

FIG. 4 illustrates a flowchart of systems, methods, and computer program products according to example embodiments. It will be understood that each block of the flowchart, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the system memory 603 and executed by, for example, the CPU 602. As will be appreciated, any such computer program product may be loaded onto a computer or other programmable apparatus (for example, a marine electronic device 300) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 300) to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the invention set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. An apparatus comprising a processor and a memory including computer program code, the memory and the computer program code configured to, with the processor, cause the apparatus to:
   transmit one or more navigation instructions to at least one motor controller to cause a watercraft to be navigated along a route;
   receive marine electronic data from one or more marine electronic data sources as the watercraft travels along the route;
   determine, based on the marine electronic data, if a hazard is in a projected path of the watercraft based on the route;
   determine a distance to the hazard from the watercraft;
   determine if the distance to the hazard is within an applied threshold distance of a plurality of threshold distances; and
   cause, via the at least one motor controller, the watercraft to stop before reaching the hazard in an instance which the hazard is determined to be in the projected path and the distance to the hazard is within the applied threshold distance.

2. The apparatus of claim 1, wherein the memory and computer program code are further configured to, with the processor, cause the apparatus to:
   determine a velocity of the watercraft;
   determine if the velocity of the watercraft is above a minimum threshold velocity; and
   cause the watercraft to stop in an instance in which the distance to the hazard is within the applied threshold distance and the velocity exceeds the minimum threshold velocity.

3. The apparatus of claim 1, wherein the memory and the computer program code are further configured, with the processor, cause the apparatus to:
   determine a depth of the hazard;
   determine if the depth of the hazard is within a threshold depth corresponding to a minimum safe depth for the watercraft; and
   cause the watercraft to stop in an instance in which the depth of the hazard is within the threshold depth and the distance to the hazard is within the applied threshold distance.

4. The apparatus of claim 1, wherein the memory and the computer program code are further configured to, with the processor, cause the apparatus to:
   cause an alert to be provided to a user, wherein the alert indicates the presence of the hazard in the projected path of the watercraft.

5. The apparatus of claim 4, wherein the memory and the computer program code are further configured to, with the processor, cause the apparatus to:
   determine a period of time that has elapsed since causing the alert to be provided to the user;
   determine if the period of time that has elapsed is greater than a threshold period of time; and
   cause the watercraft to stop in an instance in which the period of time that has elapsed is greater than the threshold period of time.

6. The apparatus of claim 4, wherein the memory and the computer program code are further configured to, with the processor, cause the apparatus to:
   receive, in response to the alert, user input indicating a desire to stop the watercraft; and
   cause, in response to receiving the user input, the watercraft to stop before reaching the hazard.

7. The apparatus of claim 1, wherein the marine electronic data is received from at least one of a chart system, a sonar system, a radar system, a position system, or a tracking system.

8. The apparatus of claim 1, wherein the marine electronic data is at least one of chart data, sonar data, radar data, positioning data, or tracking data.

9. A system with the apparatus of claim 1, wherein the system further comprises at least one of:
   a sonar system configured to emit one or more sonar beams generally forward of the watercraft, receive return echoes of the one or more sonar beams, and convert the return echoes into sonar data, wherein the sonar system is electrically connected to the apparatus and configured to transmit the sonar data to the apparatus, wherein the marine electronic data includes the sonar data; or
   a radar system configured to emit one or more radio waves at least generally forward of the watercraft, receive reflected radio waves, and convert the reflected radio waves into radar data, wherein the radar system is electrically connected to the apparatus and configured to transmit the radar data to the apparatus, wherein the marine electronic data includes the radar data.

10. A method comprising:
transmitting one or more navigation instructions to at least one motor controller to cause a watercraft to be navigated along a route;
receiving marine electronic data from one or more marine electronic data sources as the watercraft travels along the route;
determining, based on the marine electronic data, if a hazard is in a projected path of the watercraft based on the route;
determining a distance to the hazard from the watercraft;
determining if the distance to the hazard is within an applied threshold distance of a plurality of threshold distances; and
causing, via the at least one motor controller, the watercraft to stop before reaching the hazard in an instance in which the hazard is determined to be in the projected path and the distance to the hazard is within the applied threshold distance.

11. The method of claim 10 further comprising:
determining a velocity of the watercraft;
determining if the velocity of the watercraft is above a minimum threshold velocity; and
causing the watercraft to stop in an instance in which the distance to the hazard is within the applied threshold distance and the velocity exceeds the minimum threshold velocity.

12. The method of claim 10 further comprising:
determining a depth of the hazard;
determining if the depth of the hazard is within a threshold depth corresponding to a minimum safe depth for the watercraft; and
causing the watercraft to stop in an instance in which the depth of the hazard is within the threshold depth and the distance to the hazard is within the applied threshold distance.

13. The method of claim 10 further comprising:
causing an alert to be provided to a user, wherein the alert indicates the presence of the hazard in the projected path of the watercraft.

14. The method of claim 13 further comprising:
determining a period of time that has elapsed since causing the alert to be provided to the user;
determining if the period of time that has elapsed is greater than a threshold period of time; and
causing the watercraft to stop in an instance in which the period of time that has elapsed is greater than the threshold period of time.

15. A non-transitory computer-readable medium comprised of at least one memory device having computer program instructions stored thereon, the computer program instructions being configured, when run by a processor, to:
transmit one or more navigation instructions to at least one motor controller to cause a watercraft to be navigated along a route;
receive marine electronic data from one or more marine electronic data sources as the watercraft travels along the route;
determine, based on the marine electronic data, if a hazard is in a projected path of the watercraft based on the route;
determine a distance to the hazard from the watercraft;
determine if the distance to the hazard is within an applied threshold distance of a plurality of threshold distances; and
cause, via the at least one motor controller, the watercraft to stop before reaching the hazard in an instance which the hazard is determined to be in the projected path and the distance to the hazard is within the applied threshold distance.

16. The computer-readable medium of claim 15, wherein the computer program instructions are further configured, when run by the processor, to:
determine a velocity of the watercraft;
determine if the velocity of the watercraft is above a minimum threshold velocity; and
cause the watercraft to stop in an instance in which the distance to the hazard is within the applied threshold distance and the velocity exceeds the minimum threshold velocity.

17. The computer-readable medium of claim 15, wherein the computer program instructions are further configured, when run by the processor, to:
cause an alert to be provided to a user, wherein the alert indicates the presence of the hazard in the projected path of the watercraft.

18. The computer-readable medium of claim 15, wherein the computer program instructions are further configured, when run by the processor, to:
determine a depth of the hazard;
determine if the depth of the hazard is within a threshold depth corresponding to a minimum safe depth for the watercraft; and
cause the watercraft to stop in an instance in which the depth of the hazard is within the threshold depth and the distance to the hazard is within the applied threshold distance.

19. The computer-readable medium of claim 17, wherein the computer program instructions are further configured, when run by the processor, to:
determine a period of time that has elapsed since causing the alert to be provided to the user;
determine if the period of time that has elapsed is greater than a threshold period of time; and
cause the watercraft to stop in an instance in which the period of time that has elapsed is greater than the threshold period of time.

20. The computer-readable medium of claim 17, wherein the computer program instructions are further configured, when run by the processor, to:
receive, in response to the alert, user input indicating a desire to stop the watercraft; and
cause, in response to receiving the user input, the watercraft to stop before reaching the hazard.

* * * * *